Patented Feb. 25, 1947

2,416,617

UNITED STATES PATENT OFFICE 2,416,617

PREPARATION OF 2,4-DIAMINO-PYRIMIDINES

Jackson P. English and James W. Clapp, Stamford, Conn., assignors to American Cyanamid Company, New York, N. Y., a corporation of Maine No Drawing. Application July 17, 1944, Serial No. 545,394

3 Claims. (Cl. 260—251)

This invention relates to the preparation of substituted diazines. More particularly it relates to the preparation and purification of 2,4-diaminopyrimidines.

The 2,4-diaminopyrimidines are important intermediates in the preparation of 2-sulfanilamido-4-amino-pyrimidine, a compound having bacteriostatic activity. They are also useful as intermediates in the preparation of azo dyestuffs.

We have found that when 2-amino-4-chloropyrimidines are heated with ammonia and a hydroxylated solvent and thereby converted into the corresponding 2,4-diaminopyrimidine hydrochlorides the resulting product is too water soluble to recover by ordinary methods of crystallization. We have discovered, however, that if the hydrochloride salt is converted to the sulfate salt by treatment with a solution having a high concentration of sulfate ions, such as sulfuric acid, concentrated sodium sulfate solution, or the like, the sulfate salt is easily crystallized from solution to yield a product of high purity.

The present invention is not particularly concerned with the method by which 2-amino-4-halopyrimidines are produced. These compounds may be produced by any suitable process such as reacting isocytosine sulfate with phosphorous oxychloride.

In carrying out our invention we can use the crude 2-amino-4-chloropyrimidine prepared as stated above, or other halopyrimidines. This crude material is heated with ammonia and a hydroxylated solvent for from about 1 hour to about 10 hours depending upon the particular temperature used. The temperature which we may use can be within the range of 75° C. to about 250° C., but we prefer to use a temperature of about 125° C. to about 175° C. The ammonia and hydroxylated solvent are removed by evaporation and the residue, crude 2,4-diaminopyrimidine hydrohalide, is dissolved in water.

The compound is very soluble in water and does not crystallize out to any great extent even after chilling the solution. We have found that upon converting the 2,4-diaminopyrimidine hydrohalide to 2,4-diaminopyrimidine sulfate this latter compound can be readily crystallized from the solution. This we accomplish by adding concentrated sodium sulfate solution or other concentrated solutions of easily soluble sulfuric acid salts such as potassium sulfate, ammonium sulfate, etc., or sulfuric acid itself, to the solution of 2,4-diaminopyrimidine hydrohalide. The precipitate of 2,4-diaminopyrimidine sulfate is then separated from the solution and can be recrystallized from hot water to give a white product.

To obtain the 2,4-diaminopyrimidine base we dissolve the 2,4-diaminopyrimidine sulfate in water containing at least an equivalent amount of alkali or alkali carbonate. The solution is evaporated to dryness and the 2,4-diaminopyrimidine base is extracted by heating with a suitable organic solvent such as ethyl acetate, acetone, ether, benzene, etc. We prefer to use ethyl acetate, which on evaporation, leaves a practically pure, white crystalline product.

In carrying out the initial reaction of heating 2-amino-4-halopyrimidine with ammonia and a solvent, we prefer to use as a solvent, methanol, but we may use other solvents such as ethanol, propanol, isopropanol, butanol, etc. The reaction is best carried out in a closed vessel because of the volatility of the ammonia and the hydroxylated solvent used.

The invention will be described in greater detail in conjunction with the following specific example which is illustrative of the present process for the production of 2,4-diaminopyrimidine but it is not limited to the details therein set forth. Obviously, other 2-amino-4-halopyrimidines may be used, in which the 2-amino group is substituted with substituents other than hydrogen or in which the 5 and 6 positions of the pyrimidine ring may be substituted. The parts are by weight except where otherwise stated.

To prepare 2,4-diaminopyrimidine 350 parts of crude 2-amino-4-chloropyrimidine is mixed with 560 parts of methanol and 500 parts of ammonia and heated in a closed vessel with shaking for one hour at 125° C. and then for two and one-half hours at 170° to 175° C. The mixture is evaporated to dryness with warming in a current of air. The residue is stirred with enough warm water to make 800 parts, the mixture treated with activated charcoal, and filtered. The filtrate is then treated directly with a concentrated sulfate solution or sulfuric acid to maximum precipitation followed by chilling of the solution and filtering off the precipitate. The crude 2,4-diaminopyrimidine sulfate can be recrystallized from six times its weight of hot water, with treatment by activated charcoal, to give a pure, white product.

To obtain 2,4-diaminopyrimidine the 2,4-diaminopyrimidine sulfate is dissolved in water containing at least an equivalent amount of alkali or alkali carbonate, and the solution is decolorized with activated charcoal and filtered. The filtrate is evaporated to dryness and the free 2,4-diaminopyrimidine is extrated by heating the residue with ethyl acetate or other suitable solvent. Removal of the solvent from the filtered solution leaves a practically pure, white, crystalline product with M. P. 149°–150° C. (corr.).

We claim:

1. A method for the preparation and purification of 2,4-diaminopyrimidines which comprises heating together 2-amino-4-halopyrimidine, a solvent and ammonia to produce 2,4-diaminopyrimidine hydrohalide, converting said hydrohalide salt to the corresponding sulfate salt by treatment with a solution having a high concentration of sulfate ions and separating the insoluble sulfate salt.

2. A method for the preparation and purification of 2,4-diaminopyrimidines which comprises heating together 2-amino-4-halopyrimidine, an hydroxylated solvent and ammonia to produce 2,4-diaminopyrimidine hydrohalide, adding sodium sulfate solution to produce 2,4-diaminopyrimidine sulfate, separating the insoluble sulfate and neutralizing with an alkali to produce a 2,4-diaminopyridine.

3. A method for the preparation and purification of 2,4-diaminopyrimidine which comprises heating together 2-amino-4-chloropyrimidine, methanol and ammonia to produce 2,4-diaminopyrimidine hydrochloride, adding sulfuric acid to produce 2,4-diaminopyrimidine sulfate, separating the insoluble sulfate and neutralizing with an alkali to produce 2,4-diaminopyrimidine.

JACKSON P. ENGLISH.
JAMES W. CLAPP.

REFERENCES CITED

The following references are of record in the file of this patent:

UNITED STATES PATENTS

| Number | Name | Date |
|---|---|---|
| 2,250,332 | Kuh | July 22, 1941 |
| 2,230,970 | English | Feb. 4, 1941 |

FOREIGN PATENTS

| Number | Country | Date |
|---|---|---|
| 115,253 | German | November 1900 |

OTHER REFERENCES

Chem. Abstracts 1937, page 401 citing: J. Chem. Soc. 1936, pages 1557–9.

Chem. Abstracts 1938, pages 2130–1, citing: Berichte 71B, pages 87–100 (1938).

Chem. Abstracts 1919, pages 2871–2, citing: Berichte 52B, pages 869–80 (1919).